(12) United States Patent
Kuhlmann et al.

(10) Patent No.: US 7,501,592 B2
(45) Date of Patent: Mar. 10, 2009

(54) NARROW WEIGHING SYSTEM ARRANGED IN NARROWLY SPACED ROWS IN THE LATERAL DIRECTION

(75) Inventors: Otto Kuhlmann, Goettingen (DE); Peter Fleischer, Goettingen (DE)

(73) Assignee: Sartorius AG, Goettingen (DE)

( * ) Notice: Subject to any disclaimer, the term of this patent is extended or adjusted under 35 U.S.C. 154(b) by 145 days.

(21) Appl. No.: 11/584,663

(22) Filed: Oct. 23, 2006

(65) Prior Publication Data
US 2007/0034419 A1    Feb. 15, 2007

Related U.S. Application Data

(63) Continuation of application No. PCT/EP2005/003772, filed on Apr. 11, 2005.

(30) Foreign Application Priority Data
Apr. 24, 2004    (DE)    .................. 10 2004 020 145

(51) Int. Cl.
*G01G 7/04*    (2006.01)
(52) U.S. Cl. .............................. 177/210 EM; 177/212
(58) Field of Classification Search .......... 177/210 EM, 177/212
See application file for complete search history.

(56) References Cited

U.S. PATENT DOCUMENTS 6,326,562 B1    12/2001    Burkhard et al.
6,365,847 B1 *    4/2002    Muller et al. ......... 177/210 EM
6,472,618 B1 *    10/2002    Izumo et al. ......... 177/210 EM
6,861,593 B2 *    3/2005    Kuhlmann et al. .... 177/210 EM

FOREIGN PATENT DOCUMENTS

| DE | 32 43 350 A1 | 9/1984 |
| DE | 100 15 311 A1 | 10/2000 |
| EP | 0 291 258 A2 | 11/1988 |
| EP | 0 518 202 A | 12/1992 |
| EP | 1 195 588 A | 4/2002 |

* cited by examiner

*Primary Examiner*—David E Graybill
(74) *Attorney, Agent, or Firm*—Sughrue Mion, PLLC

(57) ABSTRACT

A weighing system that works on the principle of electromagnetic force compensation. The weighing system has two guide members (4'), which connect a load support (5') to a base region fixed to the housing. The weighing system also has at least one transmission lever (6'), which is mounted on the base region. The base region is divided into two separate subregions (2', 3'), the transmission lever (6') extends between these two subregions. Two weighing systems are arranged laterally side by side and their base regions are interconnected in such a way that the two subregions (2, 3) of the base region of the one weighing system are connected to the two subregions (2', 3') of the base region of the other weighing system such that their positions are fixed relative to each other.

16 Claims, 3 Drawing Sheets

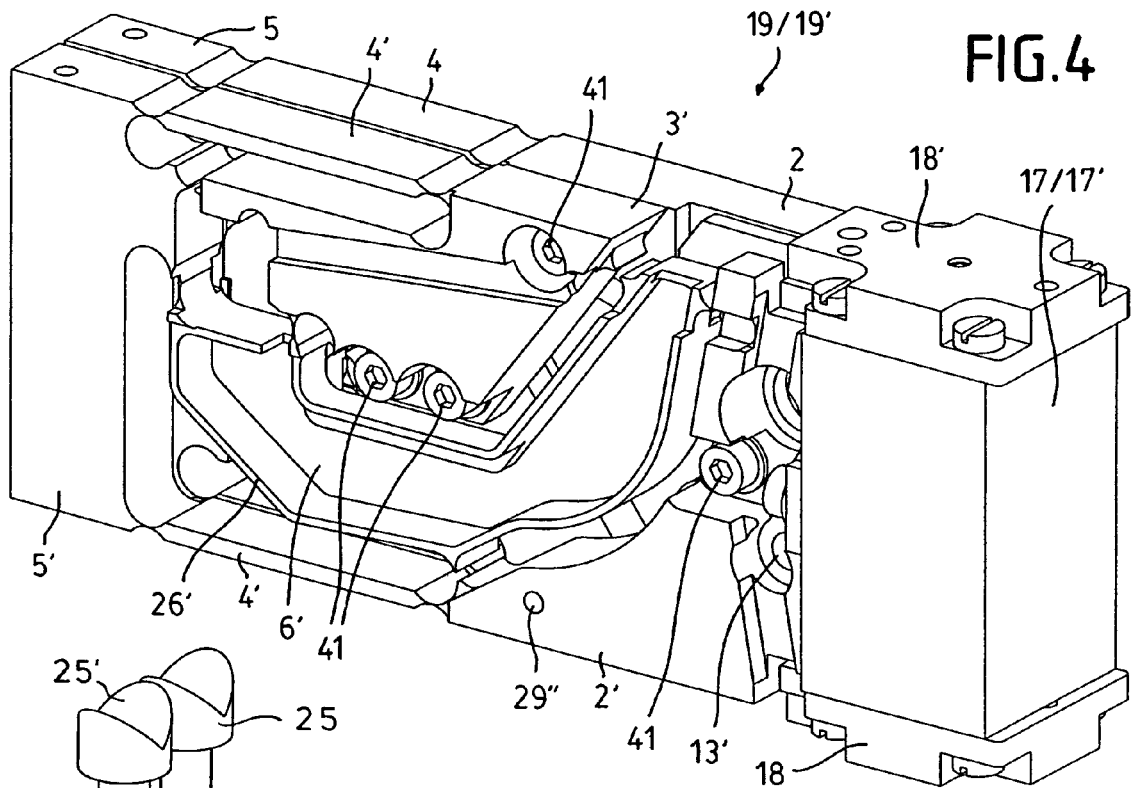
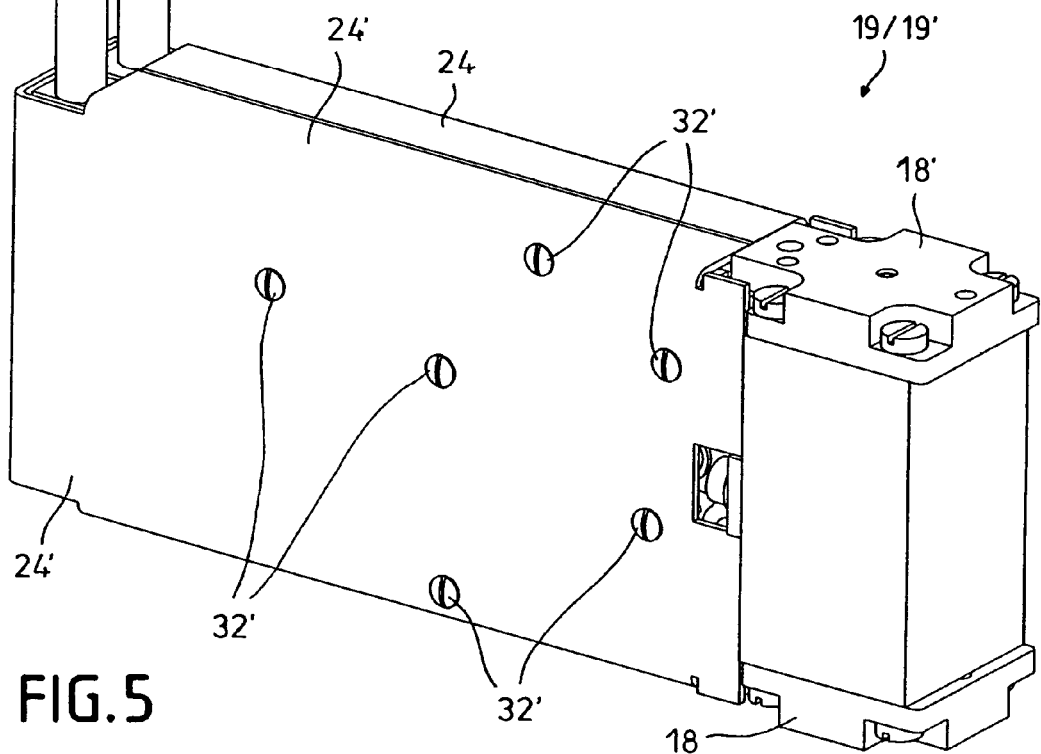

NARROW WEIGHING SYSTEM ARRANGED IN NARROWLY SPACED ROWS IN THE LATERAL DIRECTION

This is a Continuation of International Application PCT/EP2005/003772, with an international filing date of Apr. 11, 2005, which was published under PCT Article 21(2) in German, and the disclosure of which is incorporated into this application by reference.

FIELD AND BACKGROUND OF THE INVENTION

The invention relates to a weighing system that works on the principle of electromagnetic force compensation. The weighing system has two guide members that act as a parallel guide unit and connect a load support to a base region that is fixed to a housing. The weighing system also has at least one transmission lever, which has lever arms of different lengths, supported on the base region. The weight force of a load to be weighed is transmitted by a load support, and the force is applied to the shorter lever arm of the transmission lever via a coupling element. The longer lever arm is secured to a coil that protrudes into an air gap of a permanent magnet system.

A weighing system as described above is disclosed in the German patent specification DE 32 43 350 C2. In the weighing system described in DE 32 43 350 C2, the transmission lever, the permanent magnet system and the coil are located in an area that is within the parallel guide unit (i.e., within the base region, the load support and the two guide members). However, if this system is made narrower, the length of the transmission lever and the space available for the permanent magnet system would be very limiting.

A similar system is disclosed in the European publication EP 0 291 258 A2. In EP 0 291 258 A2, the base region of the weighing system is configured as two subregions that are interconnected by spacers. However, this configuration would also limit the length of the lever and the space available for the permanent magnet system.

To avoid this drawback, EP 518 202 A1 discloses a design in which the transmission lever is guided laterally along both sides adjacent to the base region by extending the lever using two braces. EP 518 202 A1 also discloses a design that disposes the coil and the permanent magnet system on the other side of the base region—i.e., outside the parallel guide unit.

A similar system is disclosed in DE 100 15 311 A1. In DE 100 15 311 A1, however, the transmission lever is guided along only one side of the base region. Thus, the design is not symmetrical with respect to the base region.

However, in the above systems, the lateral braces of the transmission lever extension will interfere if a plurality of weighing systems is arranged side by side. Therefore, the weighing systems cannot be arranged laterally in a row as tightly spaced as possible, and the lateral distance between two weighing system cannot be minimized to a desired extent. For example, if the body of the system formed by the base region, the guide members, the load support and the transmission lever is 10 mm wide, the braces to extend the transmission lever are 2 mm wide and a lateral play of 0.5 mm each is required, the distance between two weighing systems cannot be made smaller than 15.5 mm.

SUMMARY OF THE INVENTION

An object of the invention is to provide a weighing system whose width is narrow such that a plurality of weighing systems can be tightly arranged side by side without significantly limiting the length and the width of the transmission lever and/or the space available for the permanent magnet system.

An apparatus consistent with the present invention works on the principle of electromagnetic force compensation. The apparatus includes at least two weighing systems, each weighing system including: a housing; a load support; a base region fixed to the housing; two guide members that connect the load support to the base region; at least one transmission lever supported on the base region, the at least one transmission lever having a short lever arm and a long lever arm; and a permanent magnet system having at least one coil.

The short lever arm may be configured to apply a weight force transmitted by the load support to the long lever arm, which may be fixed to the at least one coil. The at least one coil may be configured to protrude into an air gap of the permanent magnet system.

The base region may comprise two subregions that are not interconnected in the individual weighing system. However, the at least two weighing systems may be interconnected such that the two subregions of one weighing system are connected to the two subregions of another weighing system. Accordingly, the positions of the respective subregions are fixed relative to each other.

Because the base region of a weighing system in the present invention is divided into, for example, two separate subregions, which are not interconnected in each individual weighing system, the transmission lever may be guided between the two subregions in such a way that the full width of the body of the system is available for the two subregions and the transmission lever. The system body is formed by the base region, the guide members, the load support and the transmission lever. Therefore, when the two weighing systems are laterally arranged side by side with the subregions of each base region connected only to the subregions of the base region of the other weighing system, the two subregions of each base region of a weighing system are fixed in their positions relative to each other only by the connections to the two subregions of the base region of the other weighing system.

By separating the base region into two subregions, the transmission lever can be made to practically any length since it is possible to guide the transmission lever between the two subregions. Of course, because the subregions within each weighing system are not interconnected, each individual weighing system is not functional. However, by connecting two weighing systems, the divided base regions of each weighing system may be fixed. By using such a design, a connection is formed without increasing the width of the individual weighing systems. In the illustrative example described above, the lateral minimum distance between two weighing systems drops from 15.5 mm to 10.5 mm.

Preferably, but not necessarily, the two weighing systems are substantially identical and are paired in such a way that the one weighing system is rotated about its horizontal central longitudinal axis relative to the other weighing system, and the two weighing systems are then connected to each other, e.g., with screws or adhesive.

An optical position sensor, comprising a transmitter and a receiver, for controlling the current flowing through the coil may be included in the weighing system pair. One part of the position sensor, e.g., the transmitter, may be disposed on the base region of one weighing system, and the other part, e.g., the receiver, may be disposed on the base region of the other weighing system. Therefore, each weighing system may include a position transmitter and a position receiver.

A permanent magnet system may also be included in the weighing system pair. The width of the permanent magnet system of each weighing system may be approximately as wide as the combined width of the two system bodies with each weighing system having a clearance into which the permanent magnet system of the other weighing system can protrude. As a result, the permanent magnet system of each weighing system can be significantly larger in diameter, which allows for a greater load carrying capacity. In the illustrative, numerical example provided above, the permanent magnet system may have a diameter up to 20.5 mm. The use of a common permanent magnet system with two air gaps is also possible.

BRIEF DESCRIPTION OF THE DRAWINGS

The invention will now be described in greater detail with reference to the schematic drawings, in which:

FIG. 4 is a perspective view of a weighing system pair, and

FIG. 5 is a perspective view of a weighing system pair with encapsulation.

DETAILED DESCRIPTION OF THE PREFERRED EMBODIMENTS

Figure 1:
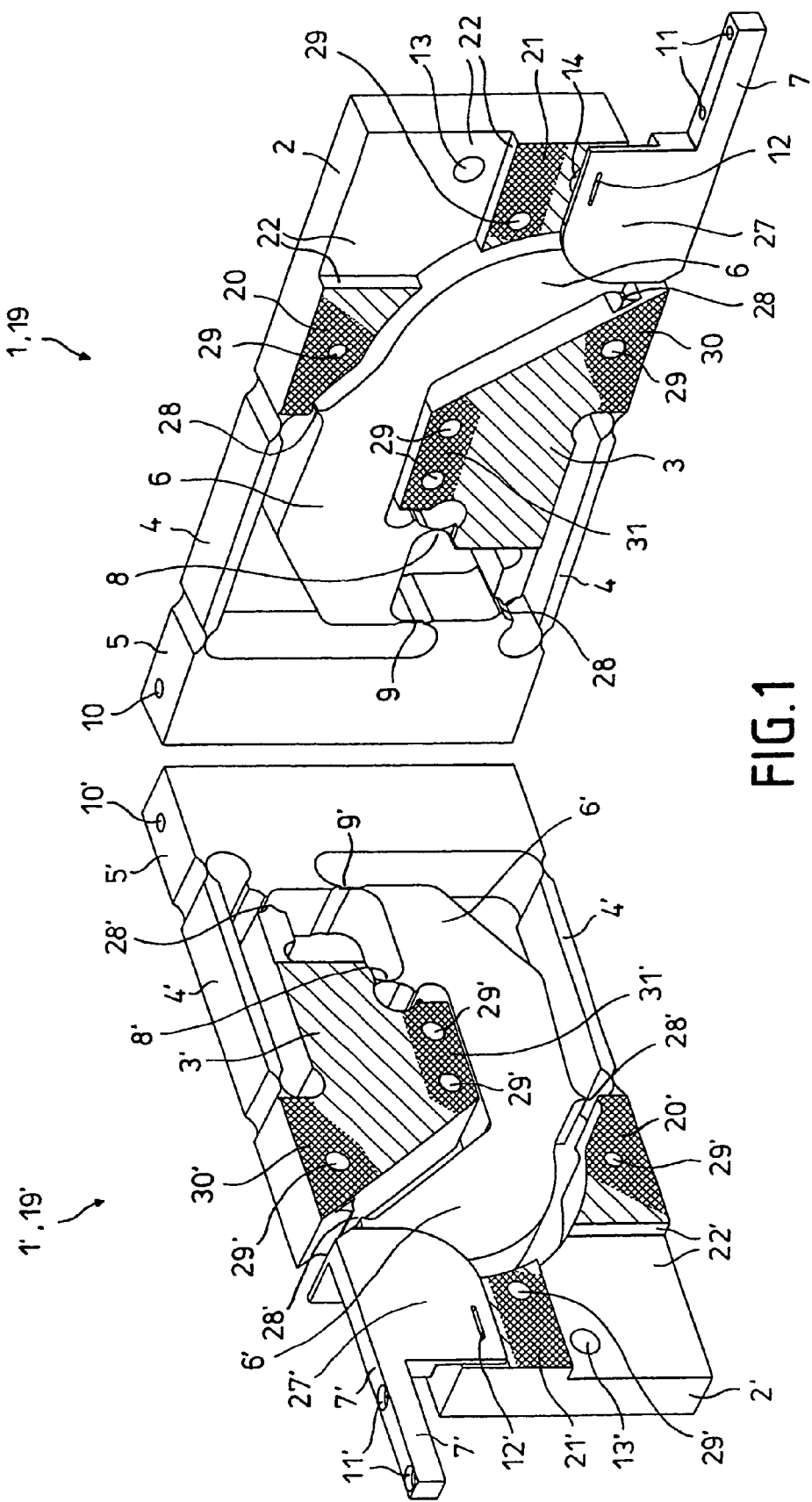
FIG. 1 shows the two system bodies of a weighing system pair when disassembled.
Figure 3:
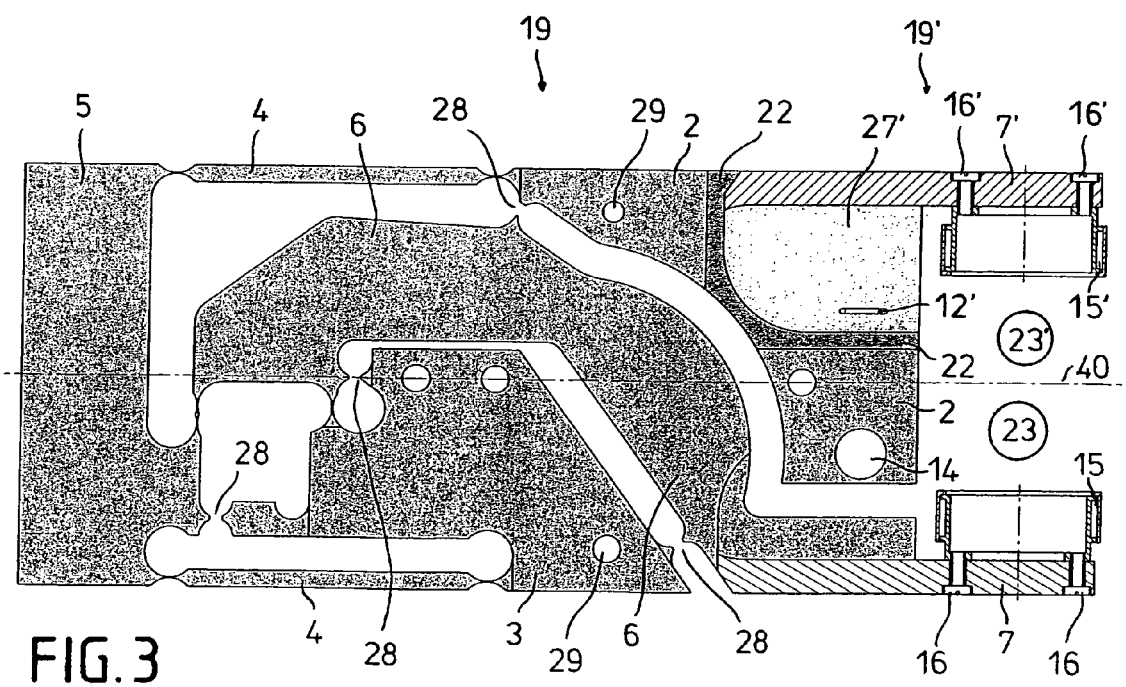
FIG. 3 is a central longitudinal section of a weighing system pair.

FIG. 1 shows two system bodies 1 and 1' respectively part of two weighing systems. The system body 1 has a base region that is divided into two subregions 2 and 3. The system body 1 also has two guide members 4, a load support 5, and a transmission lever 6. A weighing tray (not depicted) is fastened onto the load support at hole 10. The two guide members 4 act as a parallel guide unit and connect the load support 5 to the base region. The transmission lever 6 is pivotably supported on the base region by the thin point 8. The weight force of a load to be measured is transmitted by the load support 5 to the shorter lever arm of the transmission lever 6 via a thin point 9. The end 7 of the longer lever arm has fastening holes 11 for a coil 15 (FIG. 3). The coil 15 is located in an air gap of a permanent magnet system 17 (FIG. 3) and generates a counterforce that is proportional to the weight force. As illustrated in FIGS. 1 and 3, a system body, a coil, a permanent magnet system and the associated electronics form a weighing system. In the description below, the functions of the weighing system not pertinent to the understanding of the present invention will not be described in detail.

Figure 2:
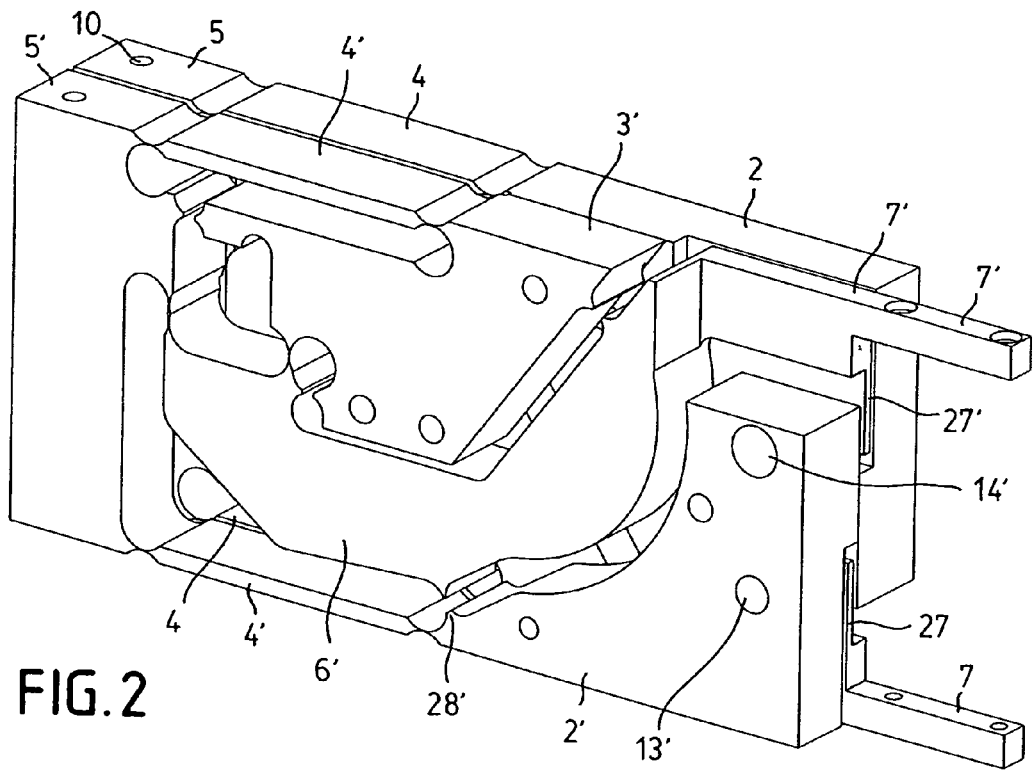
FIG. 2 shows the system bodies of FIG. 1 when assembled.

The system body depicted in FIG. 1 is configured such that the two subregions 2 and 3 of the base region are not interconnected. Thus, there is no fixed connection between the two subregions 2 and 3, which are hidden behind the transmission lever 6 in FIG. 1. As a result, the transmission lever 6 can pass between the two subregions 2 and 3 and can have any length. The transmission lever 6 can nevertheless be configured to practically have the full width of the body of the system. The transmission lever 6 is therefore highly stable and does not tend to be subject to interfering natural oscillations. A weighing system with the system body 1 of FIG. 1 is, of course, not operational on its own because the subregions 2 and 3 are not connected. However, the weighing system can become operational when two weighing systems are interconnected. That is, the two subregions of the base region of one weighing system may be connected to the two subregions of the base region of the other weighing system such that their positions are fixed relative to each other. As shown in FIG. 2, the system bodies 1 and 1' of the two weighing systems are arranged side by side such that the base regions may be interconnected after assembly.

In FIGS. 1 and 2, the individual components of the two system bodies 1 and 1' are provided with the same reference numbers; the components of the system body 1' are simply provided with a prime mark to distinguish them from the components of the system body 1.

In FIG. 1 the subregions 2 and 3 and 2' and 3', which are as wide as the body of the system, are hatched. The other regions are 0.2 mm narrower, so that they do not contact each other after assembly and can move independent of each other. Thus, once the two system bodies are assembled, only the hatched parts of the subregions of the base region can touch each other. Because of the geometry of these subregions, however, only the cross-hatched surfaces of the subregions actually touch each other. That is, the contact surface 31 touches the contact surface 31', the contact surface 21 touches the contact surface 21', the contact surface 20 touches the contact surface 30', and the contact surface 30 touches the contact surface 20'. The areas of the subregions contacting each other are firmly connected with screws. The corresponding holes or threaded holes 29 and 29' are visible in FIG. 1. Thus, the subregion 3', via the contact surfaces 30'-20 and 31'-31, interconnects the two subregions 2 and 3 of the base region of the system body 1. The subregion 2', via the contact surfaces 21'-21 and 20'-30, also interconnects the two subregions 2 and 3 of the base region of the system body 1. Because of this double connection, the two subregions 2 and 3 form a stable base region for the system body 1. Likewise, the subregion 3, via the contact surfaces 30-20' and 31-31', interconnects the two subregions 2' and 3' of the base region of the system body 1'. In addition, the subregion 2, via the contact surfaces 21-21' and 20-30', also interconnects the two subregions 2' and 3' of the base region of the system body 1'. These connections thus create a weighing system pair in which the two base regions 2 and 3 and 2' and 3' of weighing systems 1 and 1', respectively, form a stable unit. As a result, both the separate subregions 2 and 3 of the base region of the system body 1 and the separate subregions 2' and 3' of the base region of the system body 1' are fixed with respect to each other and behave like a non-separate base region.

According to another exemplary embodiment, the system bodies 1 and 1' depicted in FIG. 1 have identical components. The system body 1' is rotated 180° about a horizontal central longitudinal axis 40 (shown in FIG. 3) in relation to the system body 1. With this arrangement, each load support 5, 5' has a fixation hole 10, 10' on the topside and/or underside of the weighing system for a weighing pan. In addition, the system bodies 1 and 1' shown in FIG. 1 are each formed integrally from a single metal block (e.g., by milling or wire Electrical Discharge Machining (EDM)). This method of construction makes it possible to manufacture highly reproducible weighing systems because the method does not require any clamping, screwing, etc. with respect to the flexible or movable parts. To produce an individual system body, thin connecting webs 28 or 28' may be provided. These connecting webs connect, in particular, the two subregions 2 and 3 or 2' and 3' of the base region across the transmission lever 6 or 6', respectively, and thereby prevent the subregions 2 and 3 or 2' and 3' from falling apart. After the two individual system bodies 1 and 1' have been assembled into a pair, stability is provided by the mutual connection, and the connecting webs may be cut. (All the figures show the connecting webs already cut.)

As shown in FIG. 1, end 7 of the transmission lever 6 extends laterally and slightly beyond the base region 2/3. At the corresponding point, the subregion 2' of the base region of the (secondy system body 1' has a clearance 22', which is configured to receive the protruding part of the end 7 of the transmission lever 6. Likewise, the protruding end 7' of the transmission lever 6' of the second system body 1' can project into the clearance 22 in the subregion 2 of the base region of the first system body 1. As a result, the ends 7 and 7' of the transmission levers 6 and 6' of the respective system bodies 1 and 1' forming the weighing system pair are aligned with each other on the vertical center plane of the weighing system pair. Thus, a common dual magnet, which will be described in greater detail below with reference to FIGS. 3 and 4, may be used for both weighing systems of the pair.

As shown in FIGS. 1 and 2, an optical position sensor for controlling the electromagnetic force compensation can also be included in the weighing system pair. The optical position sensor comprises a transmitter and a receiver. The transmitter for the first weighing system 19 is located in the hole 14 in the subregion 2 of the base region and illuminates the slot 12 on the tab 27 at the rear end 7 of the transmission lever 6. The receiver, which responds to the light passing through the slot, is located in the hole 13' in the subregion 2' of the system body 1' of the second weighing system. Likewise, the transmitter for the second weighing system 19' is arranged in a hole 14' (FIG. 2) formed in the subregion 2' of the base region. The light from the transmitter pass through the slot 12' and is detected by a receiver located in the hole 13.

FIG. 3 illustrates a central longitudinal section of a weighing system pair without the permanent magnet system. In addition to the components discussed above, FIG. 3 shows the two coils 15 and 15' of the weighing system pair 19/19', which are connected to the ends 7 or 7' of the respective transmission levers 6 and 6'with fastening screws 16 or 16'. The permanent magnet system (not shown) for the (rear) weighing system 19 is located in the clearance 23 below the horizontal central longitudinal axis 40. The permanent magnet system for the (front) weighing system 19' is located in the clearance 23' above the horizontal central longitudinal axis 40. The permanent magnet systems may, for instance, be fastened to the adjoining subregions 2 and 2' of the base region.

As shown in FIG. 3, the two subregions 2 and 3 of the base region have no fixed connection to each other at all. They are interconnected by the connecting webs 28 (shown cut in FIG. 3) only during manufacture. The connecting web between the load support 5 and the subregion 3 of the base region protects the thin points of the guide members 4 from excessive deflection during manufacture and assembly.

FIG. 3 also shows the end 7 of the transmission lever 6 Also visible is the tab 27' with the slot 12' on the (front) weighing system 19' as it protrudes into the clearance 22 in the subregion 2 of the (rear) weighing system 19.

FIG. 4 is a perspective view of a weighing system pair 19/19' including the permanent magnet system 17/17'. The permanent magnet system may be a system having two individual permanent magnets, which in the example shown, have one common external soft iron return path, or a system with a single longer permanent magnet having an upper air gap for the coil 15' and a lower air gap for the coil 15. To reduce magnetic leakage into the environment, the permanent magnet system 17/17' has an upper shielding cover 18' and a lower shielding cover 18. The permanent magnet system 17/17' may be as wide as the complete weighing system pair, i.e., about twice as wide as an individual system body 1 or 1'. This configuration makes it possible to obtain a relatively wide permanent magnet system despite the narrow system body and, thus, a relatively high load carrying capacity. Similarly, a round permanent magnet system may have a diameter that is as large as two individual system bodies.

The weighing system pair in FIG. 4 is depicted in greater detail so that some details not shown in FIGS. 1 to 3 for the sake of clarity are visible in FIG. 4. For example, the connecting screws 41 that connect the two system bodies are illustrated in FIG. 4. The connecting screws are screwed in from the front side through the holes 29' (FIG. 1) in the subregions 2' and 3' of the base region, and the holes 29' are countersunk such that the heads of the screws do not protrude. In contrast, the threaded hole 29" (visible at the bottom in FIG. 4) is not countersunk because, here, the connecting screws are screwed in from the rear and the object is to maintain the full width of the system body to impart stability to the threaded connection. For the head (not visible) of this connecting screw, the corresponding hole in subregion 3 of the base region is, of course, countersunk on the rear side. In FIG. 4 it may also be seen that a substantial portion of the transmission lever 6' is milled thinner than the width if the system body and only a circumferential web 26' has the full width of the system body. This makes the transmission lever lighter without significantly affecting its stability.

As shown in FIG. 5, the pair of weighing systems 19/19' each have a weighing tray 25 and 25' with a prismatic support surface, e.g., for tablets. However, the weighing tray is not limited to just this design. Each weighing system 19/19' may also be provided with a protective plate 24 and 24'. The protective plate 24' is firmly screwed to the subregions 2' and 3' of the base region of the front weighing system 19' with screws 32'. The protective plate 24 is likewise firmly screwed to the subregions 2 and 3 of the base region of the rear weighing system 19. The protective plates protect the weighing system pair 19/19' from environmental influences.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, one (or more) additional transmission lever(s) may be provided between the load support 5 or 5' and the transmission lever 6 or 6'. The two base regions of the two weighing systems may be joined to form a weighing system pair using bonding, riveting or other joining methods instead of screws. It is also possible to make the entire system body 1 or 1' in a uniform thickness and to ensure a slight distance between the two system bodies when the weighing system pair is assembled by using washers around the holes 29 so that the load supports, the guide members and the transmission levers of the two weighing systems can move independent of each other. It is also possible to make both system bodies of a weighing system pair from a single metal block. To accomplish this, the contours of the two system bodies are milled out from each side and the separations in the region of the load supports, the guide members and the transmission levers are created by thin vertical cuts using, for example, wire EDM.

Details of the weighing system pair that are not essential to the invention, e.g., overload protections, overload limit stops, off-center load adjustment mechanisms, etc., and the complete electronics have not been discussed because they are conventional in the art.

What is claimed is:
1. A weighing apparatus comprising:
   at least two weighing systems, each weighing system comprising:
   a housing;

a load support;

a base region fixed to the housing;

two guide members that connect the load support to the base region;

at least one transmission lever supported on the base region, the at least one transmission lever comprising a short lever arm and a long lever arm; and a permanent magnet system comprising at least one coil;

wherein the short lever arm is configured to apply a weight force transmitted by the load support to the long lever arm, which is fixed to the at least one coil, wherein the at least one coil is configured to protrude into an air gap of the permanent magnet system, and wherein the base region comprises two subregions that are not interconnected in the individual weighing system, wherein the at least two weighing systems are interconnected such that the two subregions of one weighing system are connected to the two subregions of another weighing system such that positions of the respective subregions are fixed relative to each other.

2. The apparatus as claimed in claim 1, wherein the at least one transmission lever is disposed between the two subregions such that a width of the two subregions is substantially equal to a width of a system body formed by the base region, the guide members, the load support and the at least one transmission lever.

3. The apparatus as claimed in claim 1, wherein the at least two weighing systems are laterally arranged side by side such that the subregions of one weighing system touch the subregions of another weighing system.

4. The apparatus as claimed in claim 1, wherein the at least two weighing systems are substantially identical and are arranged such that an upper region of one weighing system is positioned next to a lower region of another weighing system.

5. The apparatus as claimed in claim 4, wherein the load support of each weighing system has a fastening device to attach a weighing tray on both a topside and an underside of the load support.

6. The apparatus as claimed in claim 1, wherein a system body, formed by the base region, the guide members, the load support and the at least one transmission lever, of each weighing system is made from a single metal block.

7. The apparatus as claimed in claim 1, wherein the subregions of the respective base regions are connected with screws.

8. The apparatus as claimed in claim 1, wherein the two subregions of the respective base regions are connected by bonding.

9. The apparatus as claimed in claim 6, wherein the system bodies of the respective weighing systems are made from a single metal block and form a common base region.

10. The apparatus as claimed in claim 6, characterized in that the permanent magnet system of each weighing system is approximately as wide as two system bodies and each weighing system has a clearance that accepts the permanent magnet system of another weighing system.

11. The apparatus as claimed in claim 10, wherein the permanent magnet systems of two interconnected weighing systems are disposed such that each permanent magnet system is aligned with the other.

12. The apparatus as claimed in claim 10, wherein two interconnected weighing systems use a common permanent magnet system.

13. The apparatus as claimed in claim 1, wherein each weighing system further comprises, an optical position sensor operataive to control a current flowing through the at least one coil, the optical sensor comprising a transmitter disposed on the base region and a receiver, disposed on the base region, for receiving light transmissions from an optical transmitter of another weighing system.

14. The apparatus as claimed in claim 1, wherein the respective base regions comprise a clearance for accepting a protruding part of the transmission lever of another weighing system.

15. The apparatus as claimed in claim 1, wherein two interconnected weighing systems are encapsulated by a protective plate.

16. An electromagnetic force compensation weighing apparatus comprising:

at least two weighing systems, a housing;

a load support;

a base region fixed to the housing;

two guide members that connect the load support to the base region;

at least one transmission lever supported on the base region, the at least one transmission lever comprising a short lever arm and a long lever arm; and a permanent magnet system comprising at least one coil;

wherein the short lever arm is configured to apply a weight transmitted by the load support to the long lever arm, which is fixed to the least one coil, wherein the at least one coil is configured to protrude into an air gap of the permanent magnet system, and wherein the base region comprises two subregion that are not interconnected in the individual weighing system, wherein the at least two weighing systems are interconnected such that two subregions of one weighing system are connected to the subregions of another weighing system such that position of the respective subregions are fixed relative to each other.

* * * * *